W. JONES.
PURIFICATION OF SEWAGE AND OTHER LIQUIDS.
APPLICATION FILED SEPT. 13, 1915.

1,247,541.

Patented Nov. 20, 1917.
7 SHEETS—SHEET 1.

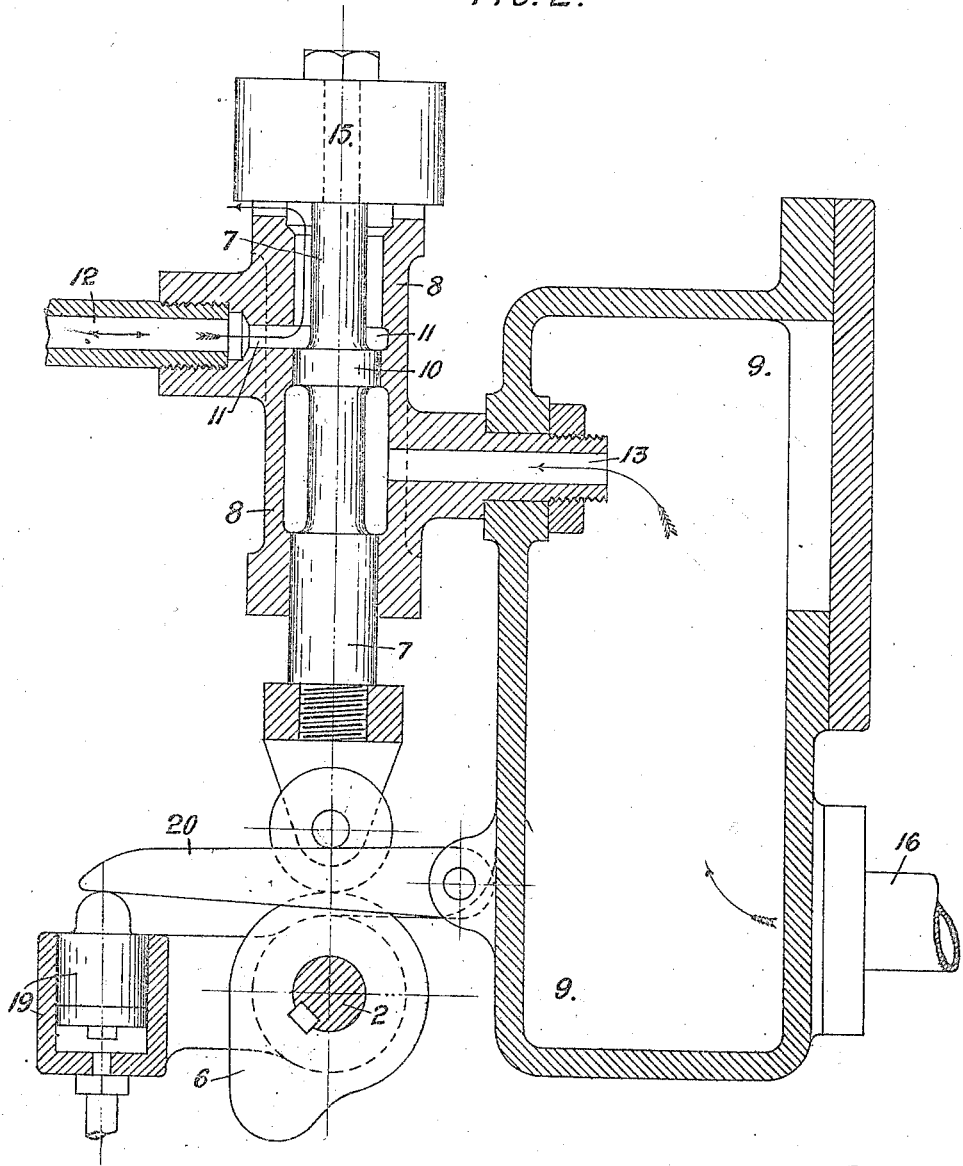

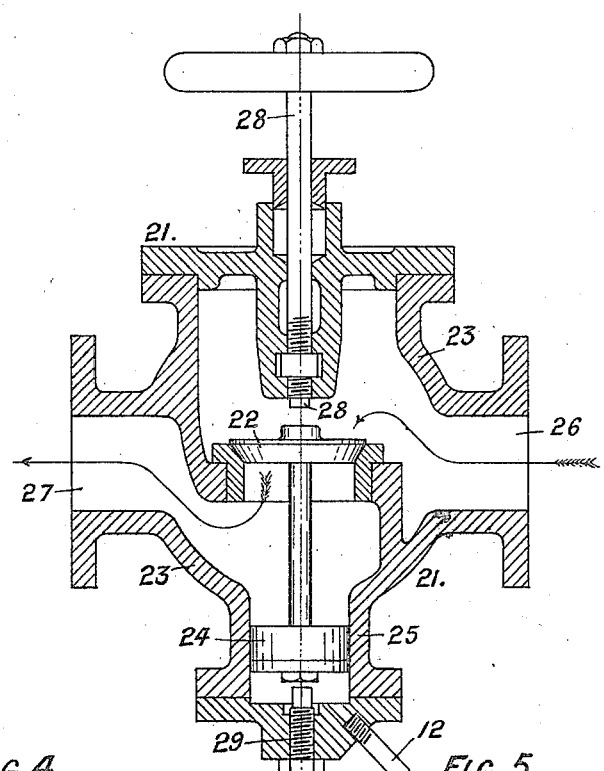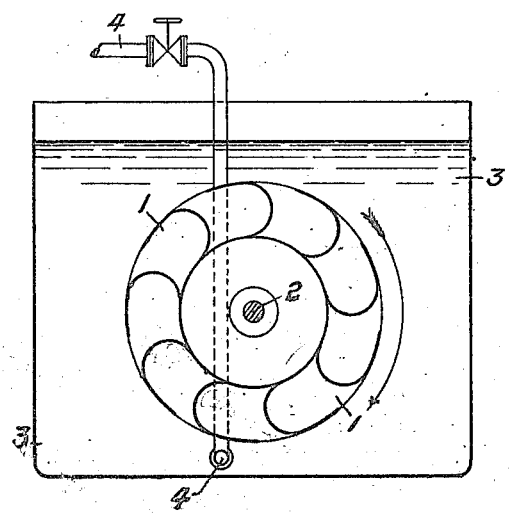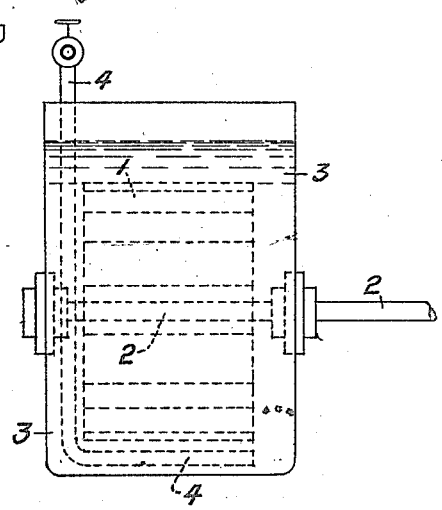

W. JONES.
PURIFICATION OF SEWAGE AND OTHER LIQUIDS.
APPLICATION FILED SEPT. 13, 1915.

1,247,541.

Patented Nov. 20, 1917.
7 SHEETS—SHEET 4.

Inventor
W. Jones
By
Atty

W. JONES.
PURIFICATION OF SEWAGE AND OTHER LIQUIDS.
APPLICATION FILED SEPT. 13, 1915.

Patented Nov. 20, 1917.

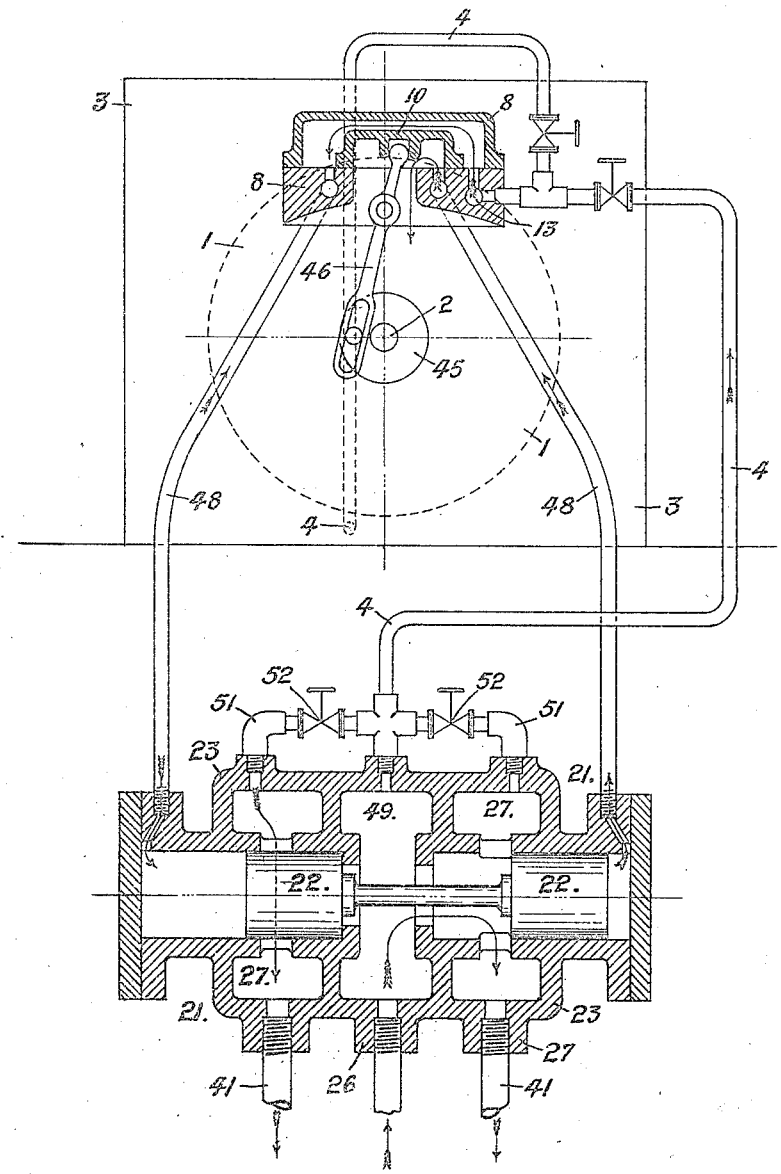

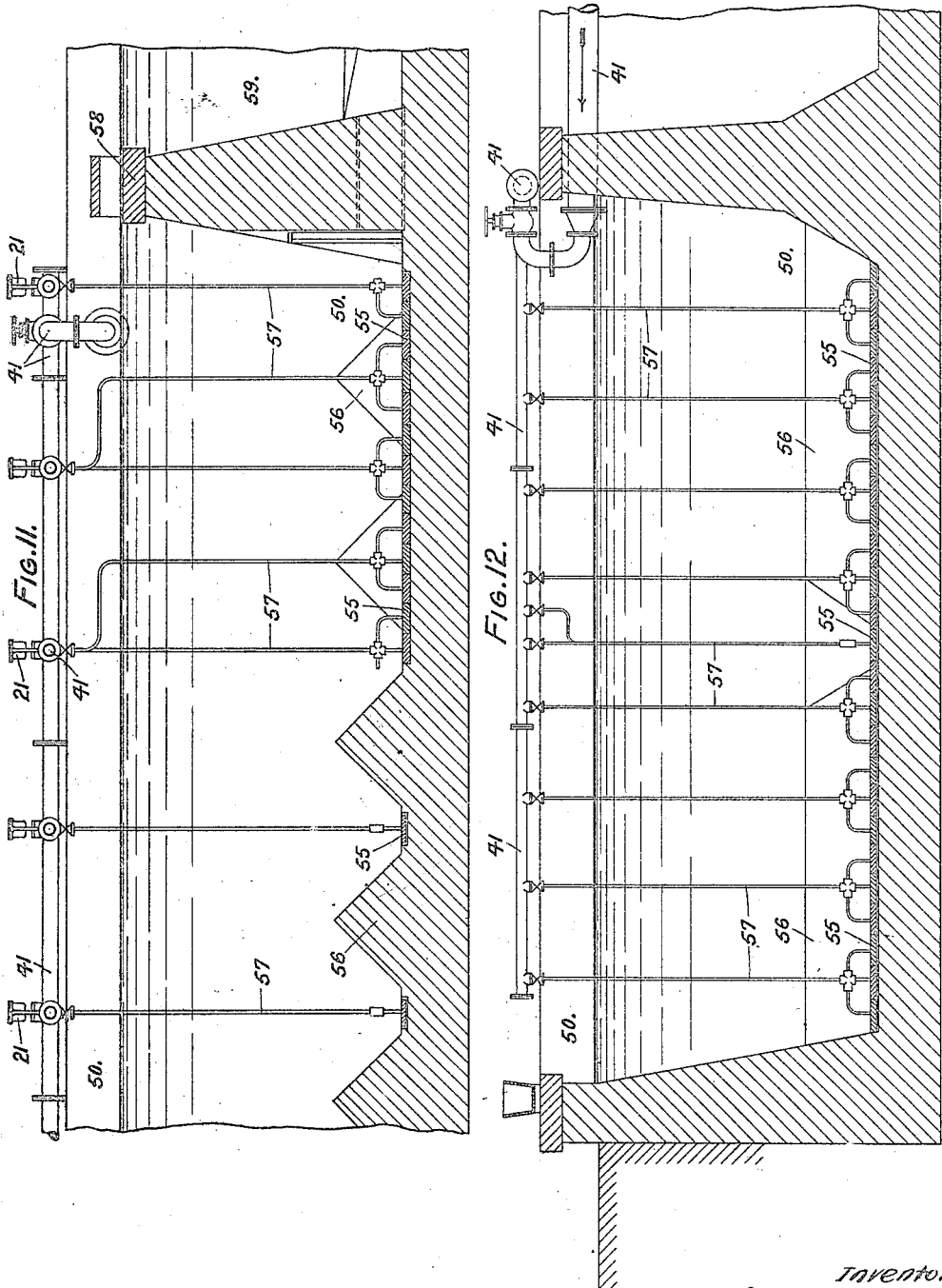

UNITED STATES PATENT OFFICE.

WALTER JONES, OF STOURBRIDGE, ENGLAND.

PURIFICATION OF SEWAGE AND OTHER LIQUIDS.

1,247,541.  Specification of Letters Patent. Patented Nov. 20, 1917.

Application filed September 13, 1915. Serial No. 50,272.

*To all whom it may concern:*

Be it known that I, WALTER JONES, a subject of the King of England, residing at Stourbridge, in the county of Worcester, England, have invented new and useful Improvements in or Connected with the Purification of Sewage and other Liquids, of which the following is a specification.

This invention has reference to system of purifying sewage and analogous impure liquids, and primarily to those wherein the sewage or liquid to be purified is introduced into a tank or vessel, and is subjected to the action of air delivered into it in bubbles, such for instance, as those produced by forcing air through porous stone, or an air diffusing body, or through other suitable distributing means; and the primary object of the invention is to render less the quantity of air required for aerating the sewage, so as to stimulate it and maintain it in a highly active or energetic state, and for agitating or distributing the sludge through the liquid, so that every part of the liquid should be acted upon and so quickly purified.

The air supplied to the liquid for the aeration of it, and its contained sludge and bacteria, is supplied in varying volumes, or varying intensities, or both, during the period of aeration; or it is supplied intermittently. By the supply of the relatively small volume of air into the liquid, the aeration of the sludge and its contained bacteria will be sufficient for the purpose which air is supplied to them; whereas when the greater or more intense supply takes place, the agitation and distribution of the sludge and bacteria, throughout the liquid is accomplished.

These periods of variable supply, or intermittance of supply, may be longer or shorter, accordingly as may be required.

In the case of treating sewage or other liquid by aerobic bacteria, or other bacteria having a specific gravity approaching that of water, the bacteria after complete distribution take a considerable time to fall to the bottom, while the time taken to effect such distribution or diffusion throughout the liquid, is comparatively short. Thus, in such a case, the period of time of the lesser supply and aeration, may be proportionately great; while that of the greater or intenser supply for the purpose of distributing bacteria and diffusing it through the liquid, may be comparatively short.

While the invention has been described as applied mainly to the purification of sewage and analogous liquids containing sludge where the purification is effected by aerobic bacteria, or other similar forms of germ life, it may be applied to other processes for the purification of liquids, or softening of water, where the aeration of such liquids or water is employed.

Illustrations of the invention, the nature of which is above described, are shown in the annexed drawings, and the invention will be further described with the aid of these drawings, most of the views of which are largely diagrammatic.

In Figures 1 to 7 the system is illustrated in which the air is supplied to the liquid to be treated intermittently, *i. e.*, the bulk of it is supplied intermittently.

With regard to the tanks in which the sewage is to be treated, in most of the views, these are not shown in the drawings, but it is to be assumed that they are of any suitable kind, and that they are furnished with means for supplying air to them, and that the arrangement of the means of supply in any particular case, will be suitable to the particular mode of treatment to which the invention is to be applied. Preferably the air will be supplied in small bubbles, such as are produced by forcing air through a porous body, disposed say, at or near the lower portion of the tank, or by equivalent air distributing appliances or means.

In Fig. 1 is shown a motor, namely a hydro-pneumatic wheel, and a plurality of pilot valves for controlling the supply of compressed air to the main air supply valves and distributing means in the sewage purifying tank or tanks, which will be adapted to be worked according to any of the systems herein described.

Fig. 2 is a cross section showing in detail the air controlling or "pilot" valves or valvular arrangement shown in Fig. 1.

Fig. 3 is a sectional elevation of a tank air supply and controlling valve controlled by the valve shown in Fig. 2.

Figs. 4 and 5 are sectional elevation and end view of the hydro-pneumatic motor for operating the valves shown in Figs. 1 and 2.

Figure 9:
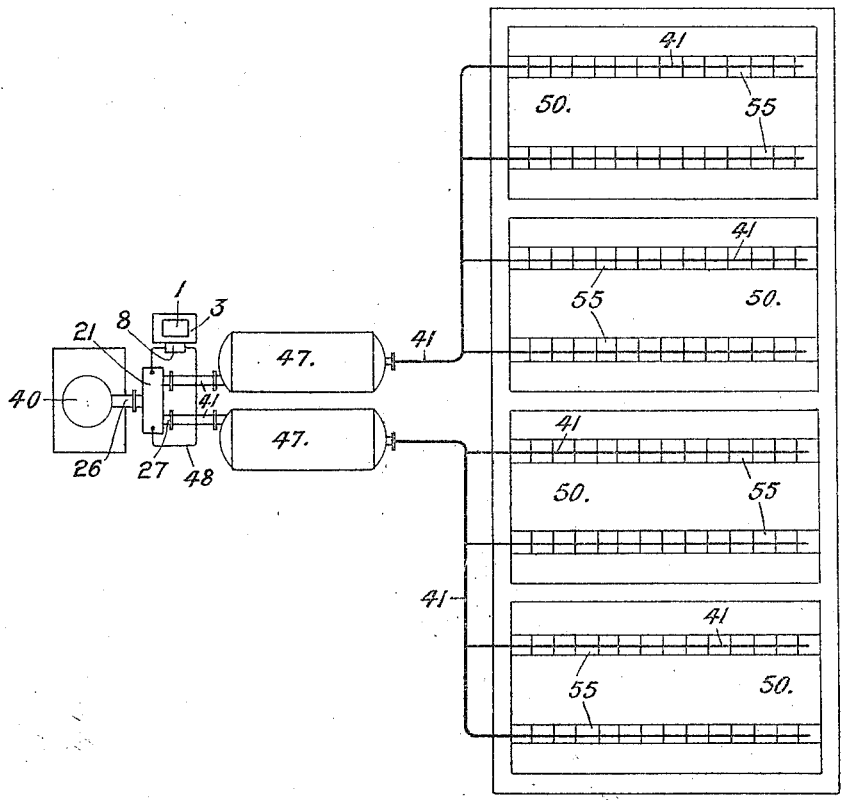

Fig. 9 is a plan in diagram, illustrating one mode of carrying out the system of treating sewage or other liquid wherein air is supplied to the sewage and distributed to it in an alternating larger and smaller volume, or volumes and pressures; and Fig. 10 is a diagram illustrating a "pilot" and main air valve arrangement for effecting the alternations of greater and less or diminishing supplies to the tanks. But this arrangement could be used in connection with the system of treatment of alternate air supply, and no supply.

Fig. 11 is a longitudinal section, and Fig. 12 is a transverse section of a purification tank, illustrating the system of air supply and cessation of supply, or pulsating system, applied to it.

Referring now to the drawings, and more particularly Figs. 1 to 7, the hydro-pneumatic motor shown in Figs. 1 to 5 consists of a bucket wheel 1, mounted on a spindle 2 within a tank 3 containing water or liquid; and it is rotated by compressed air supplied to it through a pipe 4, which discharges into the buckets which at the moment are at the bottom of the wheel 1, and displacing the water in buckets lightens the wheel which is revolved by the greater weight of water in the opposite side.

The spindle 2 of this motor has cams 6 upon it, which operate upon rollers on the end of the valve spindles 7, which are arranged to work up and down in a casing 8, fixed on an air chest 9.

The valves 7 are reduced in parts within the casing 8, and so form a piston 10, which operates in connection with a port 11, whereby air is supplied through the pipe 12 from the chest 9, by way of the port 13, to the cylinder connected with the main air supply valve shown in Fig. 3, which they actuate; and the exhaust takes place through the upper end of the casing 8 which is open. A weight 15 on the upper end of the valve 7 normally presses it down, and keeps its bowl on the cam 6.

Compressed air is supplied to the chest 9 through the pipe 16 from a compressor.

A cylinder and piston 19 is used in connection with each of the valves 7 for keeping them open when desired; the opening being effected by the piston acting on a lever 20, which acts on the spindle of the bowl of the valve 7. Air is suitably supplied to the different cylinders and pistons 19 from the source of compressed air service.

The main valves or valvular devices for supplying air to the air distributers in the tanks, are generally designated 21; and they consist of a valve proper 22 working within a casing 23, and having a piston 24 working in a cylinder 25, the interior of which is connected up with the valve shown in Fig. 2 by the pipe 12.

Compressed air is supplied to the valve 21 through the inlet branch 26, and passed to the air distributing means or diffusers in the tanks, through the outlet branch 27.

In action, when a valve 7 is lifted by a cam 6, air enters the cylinder 25, and operates on the piston 24, lifts the valve 22 off its seat; and then air flows to the air distributers or diffusers, or sets of diffusers, as the case may be, of the tank, with which the branch 27 of the valve is connected. And, conversely, when the valve 7 falls, the air supply to the cylinder 25 is cut off, and the valve closes by its own weight, and the pressure on it due to the flow of air past it, and the supply of air to the air distributer and distributers of the treating tanks, is cut off from them. Thus, in this manner, a variable or pulsating air supply and action on the sewage and its contained sludge and like matters, takes place, either all over the tank at one time, or in sections of the tank, so that parts of the contents of the tank are subjected to the action of air at different times, or the whole of the contents of a tank being operated upon or controlled by the apparatus is subjected to the action of air at different times, as the case may be, and as may be required. In all cases the aeration of the liquid being treated or in the process of purification is non-uniform.

The lift of the valve 22 off its seat, is governed by the lower end of a threaded regulating spindle 28, which passes through the top of the valve, and is capable of being screwed down more or less. And in the bottom of the cylinder 25 there is a screw stud 29, which may serve to prevent the valve 22 from completely closing on its seat, so that the complete cessation of supply of air does not take place; nevertheless the non-uniform or pulsating effect referred to does take place.

Figure 1:
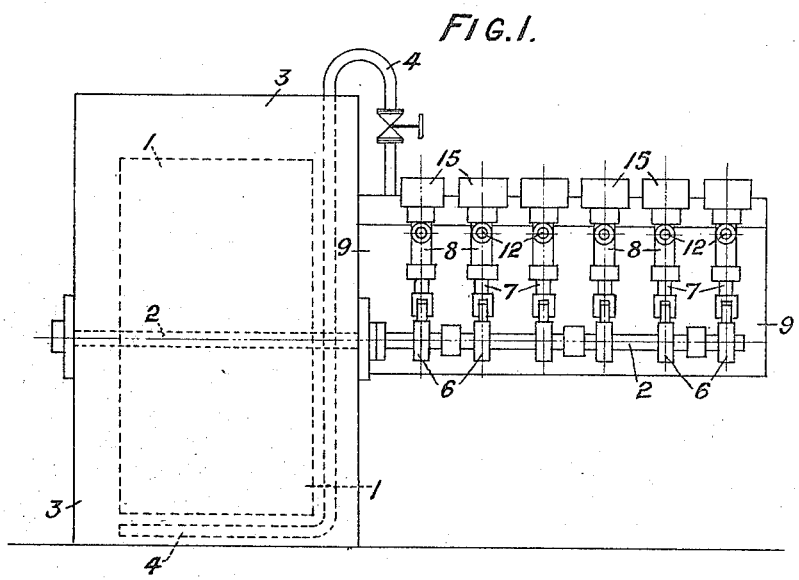
Figure 6:
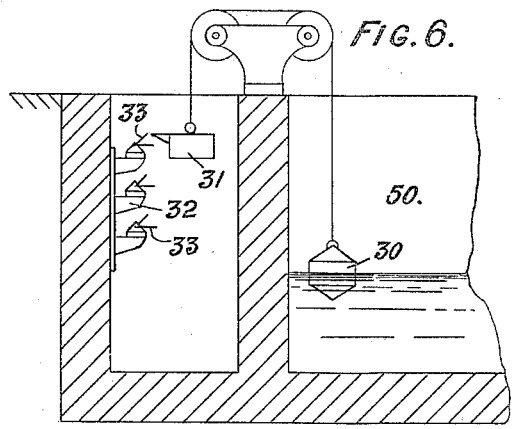
Figs. 6 and 7 are views showing hydraulic means of operating the pilot or controlling air valves through a floater device.
Figure 7:
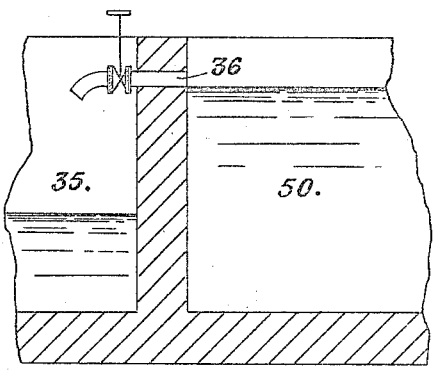

In the arrangement shown in Figs. 6 and 7, the air supply to the air distributers or diffuser is adapted to be reduced during the filling of the tank 50; and this is effected by a floater 30, acted upon by the rising and falling of the liquid in the tank, and the counterbalance weight 31, which works in a chamber outside the treating tank, and operates in connection with pilot slide or piston valves 32, which may supply air to the cylinder and pistons of main air supply valves similar to that shown in Fig. 3, which deliver the air to the distributers or diffusers.

These pilot valves may be of the known slide valve type, such as shown in Fig. 10 hereinafter described; and they may be worked in opposite directions by double pawl levers 33 of known kind, one arm of which is operated in one direction, by the weight 31 in falling, due to the rise of liquid in the tank 50; and the other arm of which is operated in the opposite direction by the weight in rising due to the falling of the floater 30.

Thus in this case the air supplied to the tank (and there may be one or more tanks and sets of valves) will be reduced as the tank fills.

In the case of the filling of the tank being a gradual one, the floater is arranged in the tank as shown in Fig. 6; but where the filling is quick, the floater may be arranged in an auxiliary tank 35 (see Fig. 7), to which the water is supplied by a pipe and valve 36 from the treating tank when full; the tank 35 having a suitable means of emptying it when the main treating tank 50 empties.

The mode of regulating the supply of air to the air distributers of the tanks, shown in Figs. 6 and 7, may be also used if desired in cases where the non-uniform air supply during the treatment of the liquid, consists in increasing and decreasing of the volume.

A hydro pneumatic wheel motor and a set of pilot valves may be used in connection with two or more sewage treating tanks, and a row or set of air distributers and diffusers in each tank, will have air supplied to it or them at the same time. Or, in other cases, in each tank different rows or sets of air distributers or diffusers will be adapted to distribute air to the sewage at different times, or one after the other. In the latter mode of treating the sewage by alternate supply and cessation of supply of air, the diffusers may, if desired, be in contact with each other, so that the whole of the bottom of the tank will consist of them; while in other cases they may be spaced from each other at suitable distances.

Figure 8:
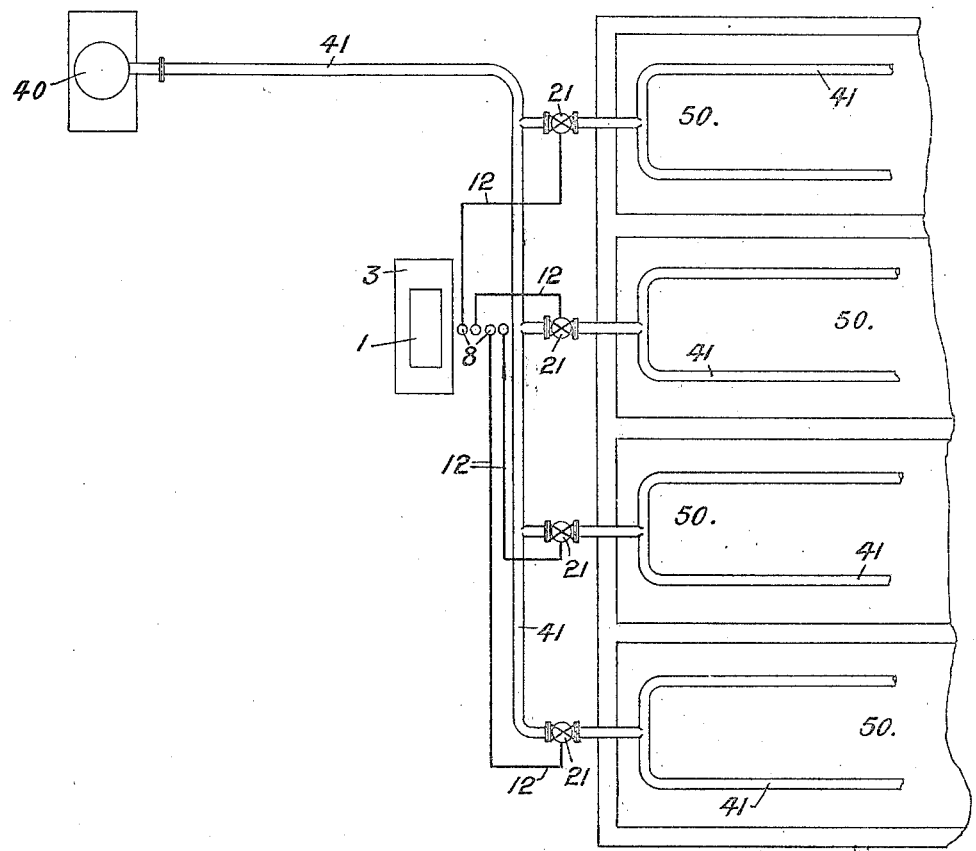
Fig. 8 is a plan and diagram showing one mode of applying the apparatus, and mode of air supply, shown in Figs. 1 to 7, in connection with a series of purification tanks.

Referring to Fig. 8, this figure shows in diagram, the air pulsating or supply and cut off system applied to several tanks; compressed air being supplied to the various valves 21 by a compressor 40, and main air supply pipe 41. In this case, air would also pass the valves 21, when they were not opened by the pilot valve, so that sufficient air would pass to keep up gentle aeration in the intervals of full supply.

In the mode of carrying out the non-uniform air supply system to the liquid in a tank, consisting of an alternate supply, and cessation of supply, to it, there are a plurality of rows of air distributers or diffusers 55 spaced apart in parallel, in the bottom of the tank 50 (which in the case shown is of channel form, the parts of the bottom between the channels being in the form of ridges 56); and in connection with each row of diffusers or distributers 55, there is a separate air supply pipe 41 extending across the tank, on each of which there is a separate pulsator valve 21, similar to the valve shown in Fig. 3, and a plurality of pipes 57 extending down from it—the pipe—to the diffusers 55; each pipe 57 having on its lower end branches, as indicated in Fig. 12.

In this case also there are longitudinal sets of diffusers or distributers 55 down the center of the tank, and to these diffusers pipes 57 are taken as indicated in Fig. 11, which is a section taken partly along the center of the tank where these diffusers exist, and partly along another line.

In an arrangement of this kind, the system of supply and cessation of supply can be carried out at different points or sections of the tank, at different moments, or in sequence; or, if desired, the supply and cessation of supply can take place simultaneously all over it.

This system of air supply, is applied to a tank in which the system of sewage or liquid supply and purification is continuous; that is to say the liquid is supplied continuously at one end, say the left hand end, and is discharged continuously over the weir 58 at the other end, into a settling chamber or tank 59 beyond this end.

Referring now to the non-uniform or variable air supply system in which the variation is in the volume, or volume and intensity of air supply, during the period of treatment in the tank, an example of a mode of carrying out this system is given in Figs. 9 and 10, in which the parts which are the same as, or equivalent to the parts shown in Figs. 1 to 8, are marked with the same figures or letters of reference.

In this case the pilot valve arrangement worked from the shaft 2 of the hydro-pneumatic motor, is of the slide valve type; and the valve for controlling the supply of air to the purifying tanks is of double piston and cylinder type, both of which are well known.

The valve proper 10 is an ordinary D valve, working within the casing 8, and is operated to and fro from the shaft 2 through a disk crank 45 on this shaft, and a slotted pivoted lever 46. Air is supplied to the interior of the casing 8 through a port 13, which received air from the pipe 4, which is supplied with compressed air from the center chamber of the valve casing 23 of the valve 21.

Air for acting on the sewage or liquid is supplied to the valve case 23 of the valvular device 21 from a compressor 40 (see Fig. 9); and it is alternately delivered into one of the two receivers 47, which act as reservoirs; and from these reservoirs it flows by the two air supply pipes 41 to the two sets of tanks 50. In some cases, however, these receivers 47 may not be required and used, in which case the air supply will cease quickly. The action of the distribution valve 22 is controlled by the pilot valve shown in the diagram in Fig. 10, and is adapted to distribute air, first to one conduit 41, then to the other, and cutting them off alternately. Air is supplied by the pilot valve 10 to one end of the valve casing 23; and acting on the piston valve 22 at that end, forces it over and closes the ports in the casing 23 leading to one of the receivers 47, and simultaneously opening the supply ports at the opposite end of the casing 23, which allow air to pass to the other of the receivers 47 from the central chamber 49 of the casing 23; the outer end of the casing 23 in which the piston valve 22 works, being open to the atmosphere by way of the valve 10, with which it connects through the pipe 48.

The pipe 4 is supplied with air from the central chamber 49, of the casing 23, to which air is supplied directly from the compressor; and there is used in connection with the annular air chests and branches 27, pipes 51, with valves 52 on them, by which a small quantity of air may always be supplied to the receivers 47, and the tanks 50 which it serves, which for the time being is not receiving air in quantity, or full quantity.

It will be plain that as the pilot valve 10 is moved from one side to the other, air will be supplied to one air branch, 27, and air supply pipe 41 connected with it or the other.

In this system the air distributing means within the tanks 50 will constitute a kind which creates a resistance to the escape of air from them, and delivered into the superincumbent body of liquid; that is, they act as a species of governors or regulator as to the supply. An advantageous species of such an air delivery appliance is that made of porous material, which offers the required resistance to the discharge of air, and delivers it in very small bubbles, so that a relatively prolonged and gradual lowering of the volume and pressure of air supplied from the receiver, and the lowering of the pressure in it, would be accomplished.

In action, when air is supplied to one of the receivers and sets of purifying tanks, the pressure in the receivers and portions of the system connected with it, will be raised by the compressor 40, forcing the purifying air directly into the receivers; and this rise of pressure will be partly increased by the resistance presented by the diffusers— marked 55; and when the valve 22 is reversed by the pilot valve 10, the supply of air to this receiver and portion of the plant is stopped, the air pressure will gradually fall in this portion of the system, as it discharges and escapes from the air diffusers or distributers 55. Thus, in this case, there is a more or less gradual rise of pressure in one portion of the system, and in the other, a gradual descent of pressure, and vice versa.

If desired the apparatus could also be arranged to work so as to give in addition to this alternation of supply, an entire cessation of supply in each portion with the exception of the quantity of air supplied through the pipes 51 and cocks 52.

In this system in which receivers as 47 are employed, there is a gradual rise of pressure, at the diffusers or air delivery means, and gradual descent; but when receivers are not employed the maximum pressure is quickly reached, and the supply is quickly cut off and ceases, and the pressure quickly falls.

In this alternating mode of carrying out the system described with reference to Figs. 9 and 10, instead of the pilot and piston type of alternating valve shown being used, the arrangements and types of valves set forth with reference to Figs. 1 to 7 could be used, suitable cams being employed.

With reference to the gradual increase or decrease in volume of air supplied to the tanks, the mechanism or means shown in Figs. 6 and 7 for effecting this gradual supply and increase and decrease of volume, may be employed. That is as the liquid in the tank falls, and the balance weight drops, it operates an air distribution pilot valve of the kind shown (or any other suitable known type of pilot valve) so as to relieve the controlling cylinder 25 of the valve 21 of pressure (see Figs. 3 and 10) and allow the valve 22 to close; and, also, if desired, at the same time to cut out a unit of compressing power; and as another and another pilot valve is operated, so another and another unit of compressing power can be cut out.

In the case, however, of electric motors being used, by a suitable control switch, the motors themselves may be cut out.

In the case of steam power being used, the steam supply pipe may be more and more throttled, when reducing the speed.

In the case of oil and gas engines, the governor supplying the gas and oil may be controlled by suitable mechanism; or an "unloading" arrangement of known type may be employed leaving the motive power running light.

In the case where several compressor cylinders are used in one compressor, the unloading may be on one or more cylinders or on one valve controlling the cylinders of the compressor.

With regard to the arrangement given in Fig. 10 of a number of pilot slide valves being used and operating as described, this arrangement can be used in connection with the system or method described with reference to Figs. 1 to 7, in the place of the piston type of valves shown in Fig. 2. In this case, instead of the little crank 45 shown in Fig. 10 being used, eccentric disks can be used on the shafting 2.

It will be understood that as regards the diagrams or drawings given, the invention is not restricted to the forms of mechanisms shown therein, and described, nor to the means or power employed to operate these mechanisms, they being merely examples, and illustrate one mode of carrying out the invention. Also, as above stated, the invention can be applied to various different types or forms of tanks, and to systems of treatment and supply and discharge of sewage, such as that known as "fill and draw off" system, or to the system of continuous supply of raw sewage, and discharge of purified effluent.

In the case where the tanks employed have their bottom in the forms of troughs or furrows and ridge, or cup shaped, or the like, the supply and cessation of supply, or pulsating method of air supply described, is advantageous; and this applies to the systems of liquid fill and draw off, and also to continuous supply and discharge.

In some cases, as when the system of fill and draw off is employed, a larger volume of air is adapted to be supplied to the sewage at the beginning of aeration, and reduced toward the end of the treatment; and this applies to cases where the filling is either gradual or quick; and this larger volume is independent of the variations of supply. The alternate supply and non supply of air, or the alternate increase and decrease of pressure and volume of air, will be repeated several times during the whole treatment in the tank.

With reference to controlling the supply of air, this can be effected in any known suitable way, as by reducing the revolutions or strokes of the compressors or blowers, or reducing the number of compressors or number of cylinders worked, (i. e. by completely stopping some or unloading some), by throttling the inlet to the compressors, or reducing the effective stroke of the compressor cylinders, or in any suitable known way.

What is claimed is:—

1. The process of purifying sewage or other impure liquid by supplying the sewage or impure liquid to a tank, supplying or delivering air in small bubbles, periodically, a plurality of times at different points to the liquid in the tank during its treatment, until it is purified, and running off the purified liquid.

2. The process of purifying sewage or other liquid by bacteria or germ life contained in the liquid by distributing the contained bacteria or germ life throughout the liquid periodically by the discharge into it of relatively large volumes of air, or of large volumes and high pressure air, through distributing means; stimulating the bacteria or germ life during the intervals of large supply or high pressure air supply, by the supply of relatively small quantities of air, and removing the purified liquid.

3. The process of purifying sewage or other impure liquid by the employment of a body of bacterial sludge in a tank supplying sewage or impure liquid to the sludge in said tank; supplying or delivering air in small bubbles, periodically a plurality of times at different points to the liquid in the tank during its treatment, until it is purified, and running off the purified liquid.

4. In the purification of sewage or other liquid, a tank for containing the liquid to be treated; an air supply apparatus adapted to supply the air to the liquid being treated; air distributing means in the tank, by which the said air is supplied into the liquid at different points, and automatic valvular apparatus adapted to cause the distributing means to deliver the air periodically to the different parts of the tanks, during the treatment; substantially as set forth.

5. In apparatus for the purification of sewage or other liquid a purifying tank; a plurality of separate means for delivering compressed air in the lower part of the tank; air supply pipes connected with said air distributing means; and means for distributing air to said separate air supply pipes at different times; substantially as set forth.

6. In apparatus for the purification of sewage or other liquid a purifying tank; a plurality of separate means for delivering compressed air in the lower part of the tank; air supply pipes connected with said air distributing means; means for distributing air to said separate air supply pipes at different times; and a compressed air supply means; substantially as set forth.

In testimony whereof I have signed my name to this specification in the presence of two subscribing witnesses.

WALTER JONES.

Witnesses:
　Ernest Harper,
　Stella Benson.